United States Patent [19]
Ando et al.

[11] Patent Number: 5,797,047
[45] Date of Patent: Aug. 18, 1998

[54] CAMERA WITH HINGED MOUNTED LENS BARRIER MOVABLE WITH MOVEMENT OF THE LENS

[75] Inventors: Hiroyuki Ando, Hachioji; Tatsuya Suzuki, Tokyo; Takashi Muroi, Tachikawa, all of Japan

[73] Assignee: Olympus Optical Co., Ltd., Tokyo, Japan

[21] Appl. No.: 707,738

[22] Filed: Sep. 4, 1996

[30] Foreign Application Priority Data

Oct. 17, 1995 [JP] Japan .................... 7-268185

[51] Int. Cl.$^6$ .................... G03B 17/04; G03B 17/00
[52] U.S. Cl. .................... 396/349; 396/448
[58] Field of Search .................... 396/348, 349, 396/448

[56] References Cited

U.S. PATENT DOCUMENTS

| | | | |
|---|---|---|---|
| 4,264,172 | 4/1981 | Miyagawa et al. | 396/349 |
| 4,264,174 | 4/1981 | Lange et al. | 396/349 |
| 4,277,157 | 7/1981 | Miyagawa et al. | 396/349 |
| 4,864,338 | 9/1989 | Wakabayashi | 396/349 |
| 5,014,077 | 5/1991 | Yomogizawa et al. | 396/349 |
| 5,546,147 | 8/1996 | Baxter et al. | 396/349 |

FOREIGN PATENT DOCUMENTS

| | | |
|---|---|---|
| 56-137135 | of 1981 | Japan . |
| 58-40537 | 3/1983 | Japan . |
| 60-23336 | 6/1985 | Japan . |
| 60-175038 | 9/1985 | Japan . |
| 61-118734 | 6/1986 | Japan . |
| 61-119139 | 7/1986 | Japan . |
| 61-31309 | 9/1986 | Japan . |
| 62-193228 | 12/1987 | Japan . |
| 63-26832 | 2/1988 | Japan . |

*Primary Examiner*—Eddie C. Lee
*Attorney, Agent, or Firm*—Louis Weinstein

[57] ABSTRACT

A camera in which a photographing lens tube is movable between a collapsed position assumed in a non-photographing condition and an extension position assumed in a photographing condition. The camera is provided with a barrier swingingly rotatable through a hinge between a fully closed position at which the barrier covers a front surface section of a photographing lens and further to take a fully open position at which the barrier retreats from the photographing lens. The barrier is biased in a closing direction when it is in a fully closed position side relative to a substantially middle position between the fully closed position and the fully open position, while being biased in an open direction when being in a fully opening position side with respect to the substantial middle position. With a power switch being switched from its OFF state to its ON state, the barrier is shifted from the fully closed position to the fully open position in conjunction with the movement of the photographing lens tube from the collapsed position to the extension position.

19 Claims, 5 Drawing Sheets

CAMERA WITH HINGED MOUNTED LENS BARRIER MOVABLE WITH MOVEMENT OF THE LENS

BACKGROUND OF THE INVENTION

1. Field of the Invention

The present invention relates to a camera, and more particularly to a camera equipped with a barrier for the purpose of lens protection.

2. Description of the Related Art

For the protection of a photographing lens when not in use, as exemplified by Japanese Unexamined Patent Publication Nos. 60-175038 and 61-118734 and Japanese Unexamined Utility Model Publication Nos. 61-119139, 62-193228 and 63-26832, there has been known a construction in which a pair of or a plurality of barrier blades are located at a tip portion of a photographing lens tube (barrel) of a camera and are designed to move to an opening or closing condition in response to a power from a built-in motor or in connection with the movement of the photographing lens tube between its collapse (retreated) position and its extension (protruded) position. On the other hand, as exemplified by Japanese Examined Patent Publication No. 60-23336, Japanese Examined Utility Model Publication No. 61-31309 and Japanese Unexamined Patent Publication No. 58-40537, there has been disclosed a structure in which a sector-like manually openable and closable barrier is provided in a front section of a camera and a link mechanism is fitted to a hinge section of the openable and closable barrier to operate the photographing lens tube through the use of the opening and closing movements of the barrier concurrently with holding it and inhibiting the excessive opening thereof. Moreover, Japanese Unexamined Utility Model Publication No. 56-137135 discloses a collapsible barrel type camera provided with a dust-proof door set comprising a pair of doors rotatably supported by a camera body to cover a protrusive portion of a lens tube at the accommodation of the lens tube, rotationally operated (taking a rotating action) in an opening direction by coming into contact with a tip portion of the lens tube at the protrusion of the lens tube and always biased in a closing direction, a lever made to unitarily rotate with the dust-proof door set, and a moving frame integrally fitted on an outside surface of the lens tube and designed to engage with the lever at the protrusion of the lens tube to drive out and hold the dust-proof door set out of a range of its angle of view.

However, in the case of a barrier-equipped camera disclosed in the aforesaid Japanese Unexamined Patent Publication Nos. 60-175038 and 61-118734 and and other like structures, there is a need for a complicated barrier blade driving mechanism to be situated within the photographing lens tube, which not only increases the number of parts to raise its manufacturing cost but also results in the increase in the size of the camera because of the necessity of a large space within the photographing lens tube. Further, with the camera disclosed in the aforementioned Japanese Examined Patent Publication No. 60-23336, Japanese Examined Utility Model Publication No. 61-31309 and Japanese Unexamined Patent Publication No. 58-40537, it is necessary to manually shift the openable and closable barrier up to a given position at photography, and hence its handling is troublesome. Moreover, in the camera disclosed in Japanese Unexamined Utility Model Publication No. 56-137135, the opening and closing mechanisms corresponding in number to the doors are necessary, thus increasing the number of parts with the result that manufacturing cost is raised. In addition, in this case, since the dust-proof doors always undergo a biasing force in its closing direction, simultaneously the biasing force is always applied onto the lens tube being in contact with the dust-proof doors so that the corresponding load is always imposed on a motor for extending the lens tube. Moreover, since the aforesaid collapsible barrel type camera has a structure in which one end side of an L-shaped lever rotates within the camera, the reduction of the load to be exerted at the extending operation of the lens tube requires ensuring some degree of length to the one end side of the lever, which produces the necessity of an in-camera space allowing the rotation of the lever to give rise to the increase in the size of the camera.

SUMMARY OF THE INVENTION

It is therefore a first object of the present invention to provide a camera having a small-sized easy-to-operate barrier.

A second object of this invention is to provide a small-sized camera which does not require an in-camera space into which the barrier retreats.

A third object of this invention is to provide an easy-to-operate camera equipped with a barrier which does not need to be manually opened by the operator.

A fourth object of this invention is to provide a camera having a simple mechanism based barrier which comprises a small number of parts.

A fifth object of this invention is to provide a camera provided with a low-cost barrier.

A sixth object of this invention is to provide a camera equipped with a barrier with a high reliability.

A seventh object of this invention is to provide a camera equipped with a barrier which can prevent the camera from falling down.

An eighth object of this invention is to provide a camera equipped with a barrier which can prevent the reflected light from the barrier from being incident on a photographing lens tube.

A ninth object of this invention is to provide an easy-to-operate camera having a barrier which does not require a manual closing operation by the operator.

A tenth object of this invention is to provide a camera in which a barrier takes its fully opening position or its fully closing position in connection with the operation of a change-over power switch.

An eleventh object of this invention is to provide a camera having a high-reliability barrier which not only is capable of the size reduction of the camera and the reduction in the number of parts, but also which employs a simplified mechanism, and even which permits easy operation.

For these purposes, in accordance with this invention, there is provided a camera in which a photographing lens tube is movable between its collapsed position in a non-photographing condition and its extension position in a photographing condition, the camera basically comprising driving means for driving the photographing lens tube between the collapsed position and the extension position and one member rotatable about a supporting shaft provided in parallel to a plane substantially perpendicular to the optical axis of a photographing lens to be shifted to a closing position at which at least a front surface section of the photographing lens occupies a covered condition and to an opening position at which the photographing lens front surface comes into an exposed condition, and the tube coming into contact with the barrier to shift it to the opening position when moving to the extension position.

These as well as other object(s) and advantages of the present invention will become more apparent in the following description and the accompanying drawings.

DESCRIPTION OF THE PREFERRED EMBODIMENT

Figure 1:
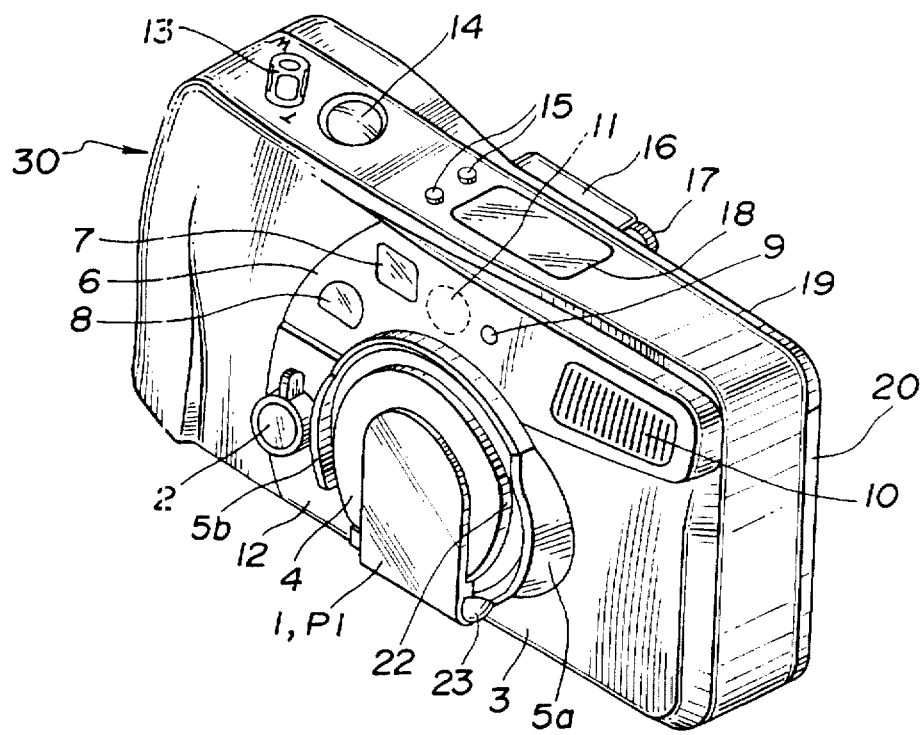
FIG. 1 is a perspective view showing an external configuration of a camera, in which a barrier is in its fully closed state, according to a first embodiment of the present invention.
Figure 2:
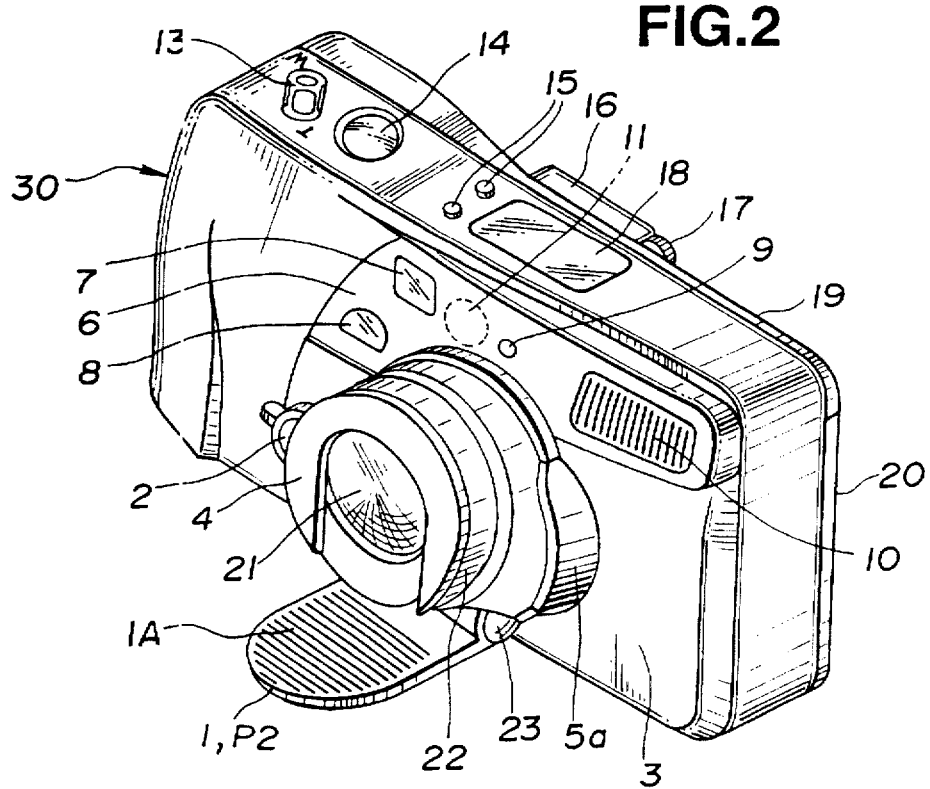
FIG. 2 is a perspective view showing a camera which is the same as that of FIG. 1 but where the barrier is in a fully opening state.

A description will be made hereinbelow of embodiments of the present invention with reference to the drawings. FIG. 1 is a perspective view showing an external configuration of a camera in which a barrier is in a fully closed condition while FIG. 2 is a perspective view showing the appearance of the camera in which the barrier is in a fully open condition. As shown in FIGS. 1 and 2, in the camera according to this embodiment a front cover 3 is attached to a front side of a camera body 30 to constitute a portion of the camera body 30 whereas a rear cover 19 is fitted to a rear side of the same camera body 30. At a substantially center portion of the front side of the camera body 30, a photographing lens tube 22 accommodating a photographing lens 21 is provided to be movable along the optical axis of the photographing lens 21 within a range between its collapsed position and its extension position.

On the top surface of the camera body 30, there are located a zoom button 13 for carrying out the zooming operation, a release button 14 for triggering a release operation, mode switching buttons 15, for example, comprising a plurality of buttons for switching into various modes, a display LCD window 18 for displaying various information, and so on. Further, on the front cover 3 there are situated a power switch 2 rotationally operated (operated by rotation) to perform the ON/OFF switching operation of a power supply placed at the left side of the photographing lens tube 22, a pair of front cover projecting portions 5a, 5b at the right and left side and in the vicinity of the photographing lens tube 22, an AF (AutoFocus) light-receiving section 12 positioned under the power switch 2, a front panel 6 made of an infrared transmission material and positioned above the photographing lens tube 22 to extend horizontally, and so on. In addition, the front panel 6 is provided with an objective side finder window 7 being a window in the objective side of a finder optical system, an AE (Automatic Exposure) window 8 for the photometry of a subject, a self-timer LED (Light Emitting Diode) 9 for emitting light during self-timer photography, an electric flash window 10 for generating an electric flash to illuminate a subject, an AF projecting section 11 for projecting an AF light beam to measure the distance from a subject, and other devices. On the other hand, in the rear cover 19 side there are disposed a finder eyepiece window 16 being a window in the eyepiece side of the finder optical system, a focusing control 17 for the focusing adjustment of the finder optical system, and a rear door 20 openable and closable for accepting a film cartridge.

In the above-described camera, a barrier 1 comprising a substantially U-shaped plate member for opening and closing the front surface of the photographing lens 21 is attached to the aforesaid front cover 3 through a barrier hinge 23 located at a lower portion of the front surface of the camera, so that the barrier 1 can swing about the barrier hinge 23 to assume a fully closing position (position P1 in FIG. 1) for covering the front surface of the photographing lens 21 and further assume a fully opened position (position P2 in FIG. 2) separating from the front surface of the photographing lens 21. The barrier 1 has a width smaller than the outer diameter of the photographing lens tube 22 and has a configuration capable of at least covering the photographing lens 21, that is, has a minimum size necessary for playing its own role. In addition, the rear surface 1A of the barrier 1 has a plurality of light-blocking grooves for the prevention of reflection made therein, particularly it is designed to prevent the reflected marginal light from coming to the photographing lens 21 when being in the fully open position P2.

As described before the barrier 1 is smaller in dimension than the photographing lens tube 22, whereas the circumferential portion of the tube tip portion 4 is protrusively formed into a substantial U-configuration which can accept the barrier 1 therein not to made a large difference in height between the barrier 1 and the tube tip portion 4 when the barrier 1 takes its fully closed position. In this case, with the small-sized barrier 1, there is a possibility that, when the photographing lens tube 22 is greatly exposed, an external force due to a collision or the like is applied from the front side of the camera to the photographing lens tube 22 to exert an excessive load thereon. For this reason, the aforesaid front cover projecting portions 5a, 5b are formed integrally on the front cover 3 to undertake the load together with the barrier 1.

Figure 3:
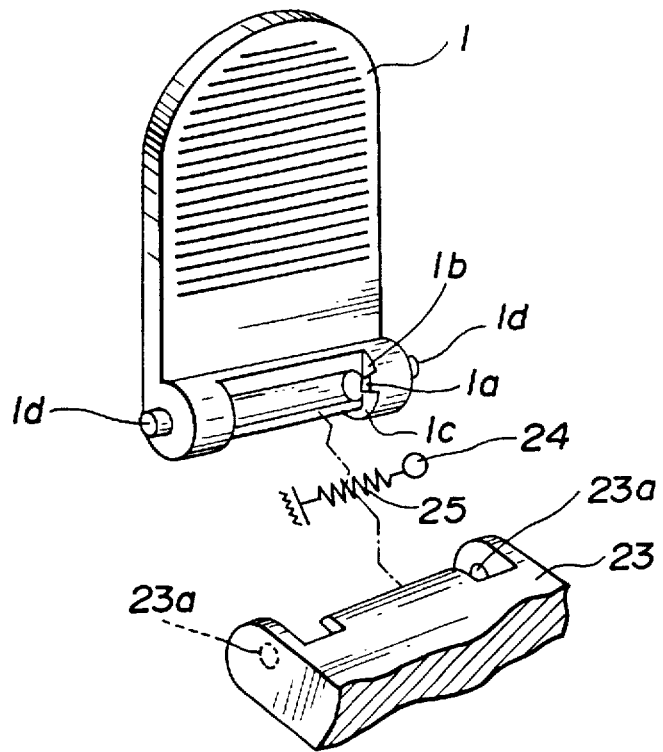
FIG. 3 is an exploded perspective view showing a click mechanism for the barrier of the camera shown in FIGS. 1 and 2.

In addition, the barrier 1 is held in its fully closed position P1 or its fully open position P2 by means of a click mechanism, which will be described with reference to FIG. 3. FIG. 3 is a partial exploded perspective view showing the click mechanism for the barrier 1. In FIG. 3, hinge holes 23a are made in both sides of the barrier hinge 23 placed at a front lower portion of the front cover 3 and barrier shafts 1d protrusively formed on the rotational center portions of the barrier 1 are fitted in the hinge holes 23a, respectively, so that the barrier 1 is rotatable or swingable about the rotational center portions. Further, a projecting or convex cam 1a protruding along the barrier shaft 1d to serve as a click means is formed inside the hinge section of the barrier 1 and further recessed or concave cams 1b, 1c serving as click means and holding means are made in both sides of the cam 1a. Inside the barrier hinge 23, provided is a ball 24 acting as holding means and click means for exhibiting a click function when reaching the opening or closing state and further provided is a spring 25 serving as click means and holding means and biasing the ball 24 toward the barrier shaft 1d. Accordingly, the ball 24, biased by the spring 25, is urged into contact with the cams 1a, 1b and 1c. That is, the ball 24 is brought into contact with the cam 1b when the barrier 1 takes the fully closing position P1 while being brought into contact with the cam 1c when it takes the fully opening position P2. In addition, with the respect to the cam 1a being at a substantially middle position between the fully closing position P1 and the fully opening position P2, the barrier 1 is rotationally biased in the closing direction or in the opening direction and held when reaching the fully closing position P1 or the fully opening position P2.

Secondly, a description will be taken hereinbelow of an operation of the camera according to this embodiment which camera is equipped with the barrier mechanism thus arranged. In the case of transferring from the collapsed position (accommodated position) of FIG. 1 to the extension position (photographing position) of FIG. 2 that permits the photographing operation, the power switch 2 is rotationally operated to make the power supply turn into the ON state so that the photographing lens tube 22 linked to an electric driving source (not shown) starts to protrude. At this time, the photographing lens tube 22 taking the extension action pushes, at its tip portion, the barrier 1 being in the fully closing position P1 so that the barrier 1 rotates about the barrier hinge 23 to come into the opening condition. Once the barrier 1 passes through the aforesaid substantially middle position and reaches a given position, then the barrier 1 is released from the pushing force due to the protrusion of the photographing lens tube 22 but is rotationally shifted up to the fully open position P2 by the force generated in such a manner that the cam 1a comes into contact with the ball 24 biased by the spring 25. When the barrier 1 thus takes the fully open position P2, the ball 24 comes into contact with a given portion of the cam 1c for a click so that the barrier 1 is held in the fully open state.

On the other hand, in the case of transferring from the photographing state of FIG. 2 to the accommodated state of FIG. 1, the power switch 2 is rotationally operated to make the power supply turn OFF, with the result that the photographing lens tube 22 linked with the electric driving source (not shown) starts to retreat and stops after reaching the accommodated state. At this time, the barrier 1 remains in the held state by the aforesaid click means. Accordingly, the barrier 1 is manually rotated in the closing direction to be shifted up to the fully closing position P1. In this case, when the barrier 1 passes by the aforesaid substantially middle position, irrespective of the manual operation the barrier 1 is rotated up to the fully closing position P1 by the force generated with the cam 1a being brought into contact with the ball 24 biased by the spring 25.

As described above, according to this first embodiment, regardless of the provision of the barrier 1 having a width smaller than the dimension of the photographing lens tube 22, unlike the case of the prior slide barrier, the camera is not required to contain a space for the movement of the barrier, thus achieving size-reduction of the camera. In addition, since the barrier 1 opening operation is made with the direct pushing force due to the contact of the photographing lens tube 22 and further with the auxiliary operation of the spring 25 and the clicking ball 24, the mechanism is simply accomplished with a small number of parts to lower the manufacturing cost and it hardly suffers operational failures to improve its reliability. Moreover, since, with the operation of the power switch, the photographing lens tube 22 is driven from the accommodated position to the extension position (photographing position) and the barrier 1 is designed to automatically get into the open condition in connection with the movement of the photographing lens tube 22, a special barrier 1 opening operation is unnecessary to enable easy operation of the camera.

Figure 4:
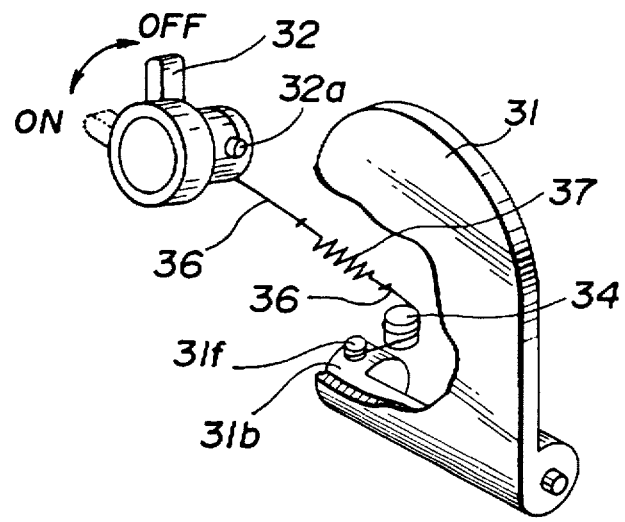
FIG. 4 is a partial exploded perspective view showing a barrier mechanism section of a camera according to a second embodiment of this invention.

Furthermore, a camera according to a second embodiment of this invention will be described hereinbelow with reference to FIG. 4 being a partial exploded perspective view showing a barrier mechanism section. Although, in the above-described first embodiment, for closing the barrier 1 the power switch 2 is turned off to shift the photographing lens tube 22 from the photographing position of FIG. 2 to the accommodated position of FIG. 1 and then the barrier 1 is manually pushed to come into the closed state, a barrier 31 applied to a camera according to the second embodiment is further closed in connection with the operation of a power switch 32. Although not shown in FIG. 4, the barrier 31 is equipped with cams 1a, 1b and 1c acting as click means which are the same structures as those in FIG. 3 and further provided with a click spring 25 and a ball 24 also serving as click means. The barrier 31 is rotated to and held at the fully closing position P1 and the fully opening position P2. In addition, as shown in FIG. 4 the power switch 32 is connected through a string 36 being a connecting means to a projection 31f protrusively made in the vicinity of the rotating center of the barrier 31, and a tension spring 37 is provided in the middle of string 36. More specifically, the string 36, one end of which is connected to the projection 31f of the barrier 31, is turned about a pin 34 fixedly secured onto the camera body 30 and then wound or coiled around the rotational circumference of the power switch 32, while the other end thereof is connected to a boss 32a protrusively planted on the same rotational circumference. The spring 37 is made to come into a charged or tensile (i.e. extended) condition in response to the rotational movement of the power switch 32 for the switching from the ON state to the OFF state. At this time, the tensile force of the spring 37 is larger than the holding force of the aforesaid click means at the fully open position P2. The linking mechanism between the power switch 32 and the barrier 31 through the string 36 is housed within the front cover 3 or the camera body 30, thus creating no problem in the external appearance of the camera. The other arrangements of the camera according to the second embodiment are the same as those of the camera according to the first embodiment (see FIGS. 1 and 2).

Secondly a description will be made hereinbelow of an operation of the camera according to this embodiment which is provided with the barrier mechanism thus constructed. First, for shifting from the accommodated state of FIG. 1 to the photographing state of FIG. 2, the power switch 32 is rotationally operated to turn ON. The operation taken at this time is the same as that of the above-described first embodiment. On the other hand, for shifting from the photographing state of FIG. 2 to the accommodated state of FIG. 1, the power switch 32 is rotationally operated clockwise in FIG. 4 to change from the ON state to the OFF state. In response to this rotational operation, the photographing lens tube 22 begins to take the accommodated action by an electric drive source (not shown), besides the string 36 is additionally wound around the switch 32 to make the spring 37 come into a tensile condition. At this time, since, as mentioned before the tension of the spring 37 exceeds the holding force of the click means, the spring 37 pulls the barrier 31 in the closing direction against the holding force of the click means. In this case, if the photographing lens tube 22 has begun to collapse, the barrier 31 is once brought into contact with the photographing lens tube 22 and then rotates to follow the photographing lens tube 22 in a state with keeping the contact therewith. Simultaneously with reaching the accommodated position, the barrier 31 stops at the fully closing position P1. When being at this collapsed position, the spring tension of 37 is released, whereas the barrier is held at the fully closing position P1 by the help of the click means.

The camera according to this second embodiment substantially exhibits the same effect as the above-described first embodiment, and further does not require the manual closing operation because the closing operation of the barrier 31 is linked with the ON-to-OFF operation of the power switch 32 for collapsing the photographing lens tube 22, thus accomplishing easier, more automatic operation.

Figure 5:
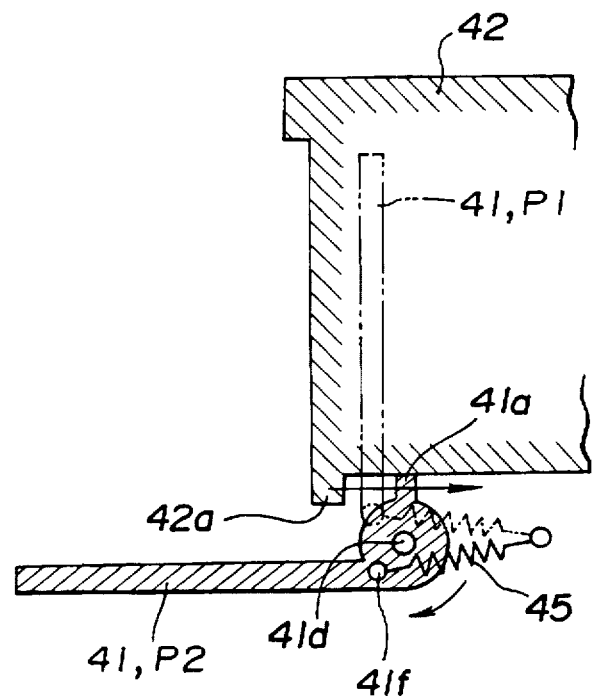
FIG. 5 is a side elevational partial cross section showing a barrier rotating and holding mechanism of a camera according to a third embodiment of this invention, the cross section being viewed from a transverse direction of the camera.

Furthermore, referring to FIG. 5 a description will be made hereinbelow of a camera according to a third embodiment of this invention. The camera according to the third embodiment differs from the cameras according to the above-described first and second embodiments in the structure for rotating and holding the barrier to and at the opening and closing positions. The other structures not shown in FIG. 5 are the same as that of the camera according to the first embodiment. FIG. 5 is a partial cross section, viewed from the transverse direction of the camera, of a barrier rotating and holding mechanism in the camera according to this embodiment, showing a state that a photographing lens tube 42 moves to immediately before the accommodated position in the process of movement from the extension position to the accommodated position. A barrier 41 is rotatable between the fully opening position P2 and the fully closing position P1 about a barrier rotary shaft 41d. As shown in FIG. 5, one end portion of a coil spring 45 serving as a biasing means is fixedly secured onto the camera body side, while the other end portion thereof is fixedly secured to a projection 41f provided on the barrier 41 to be spaced apart from the rotational center of the barrier 41 and to be positioned so that the spring biasing force works in different directions (opposite directions) according to whether the barrier 41 takes the fully opening position P2 or the fully closing position P1. That is, a toggle mechanism is established such that the spring biasing force is applied in the closing direction when the barrier 41 is in the closed state and is applied in the opening direction when the barrier 41 is in the open state. Further, a projection 42a acting as an engaging means is located on the tip portion of the photographing lens tube 42 while a projection 41a serving as an engaging means is situated on a circumferential portion of the rotating section of the barrier 41, so that the projection 42a engages with the projection 41a through the drawing movement of the photographing lens tube 42 to make the barrier 41 rotate in the closing direction.

Secondly, a description will be taken hereinbelow of an operation of the camera according to this embodiment which is equipped with the barrier mechanism thus arranged. When the power switch 2 is in the OFF state for the accommodated position as shown in FIG. 1, the barrier 41 is biased by the biasing force of the spring 45 in the closing direction and is brought into contact with the tip portion of the photographing lens tube 42 and held in such a state due to the biasing force of spring 45. When in this state, shown in dotted fashion, the power switch 2 is turned ON, as well as the above-described first embodiment the photographing lens tube 42 is driven by an electric drive source (not shown) toward its extension position, while the tip portion of the photographing lens tube 42 pushes against and rotates the barrier 41. When the barrier 41 runs over a substantially middle position between the fully closed position P1 and the fully opening position P2 due to the pushing by the photographing lens tube 42, the biasing force of the spring 45 changes from the closing direction at the fully closed position P1 to the opening direction so that the barrier 41 is opened up to the fully open position P2 by the biasing force of the spring 45, and is held in that state.

On the other hand, when the power switch 2 is operated to the OFF state after the completion of the photography, the photographing lens tube 42 starts to move from the extension position to the accommodated position and then comes into the drawing state as shown in FIG. 5. When the photographing lens tube 42 further moves from this state in the direction indicated by an arrow to reach the vicinity of the accommodated position, the projection 42a formed on the tip portion of the photographing lens tube 42 engages with the projection 41a of the barrier 41 so that the barrier 41 rotates clockwise in FIG. 5, i.e., in the closing direction, about the rotary shaft 41d in conjunction with the drawing movement of the photographing lens tube 42. Furthermore, when the barrier 41 is rotated by the photographing lens tube 42 to the closing direction side with respect to the aforesaid substantial middle position, the biasing force of the spring 45 is again switched to the closing direction side, whereupon the barrier 41 is finally rotated up to the fully closing position P1 to cover the front surface of the photographing lens tube 42 being at the accommodated position, and is then held in that state.

According to this third embodiment, the camera substantially demonstrates the same effects as those of the camera according to the first or second embodiment. In addition, since the closing operation of the barrier 41 is automatically made in conjunction with the accommodating operation (collapsing operation) of the photographing lens tube 42, the number of parts is reduced and the structure becomes simple and even the operation becomes simplified. Incidentally, in the camera according to the third embodiment the click means comprising the ball 24 and the spring 25 in FIG. 3 can also be incorporated into the aforesaid barrier 41. In this instance, the barrier 41 can more surely be positioned and held at the fully open position and the fully closed position.

Figure 6:
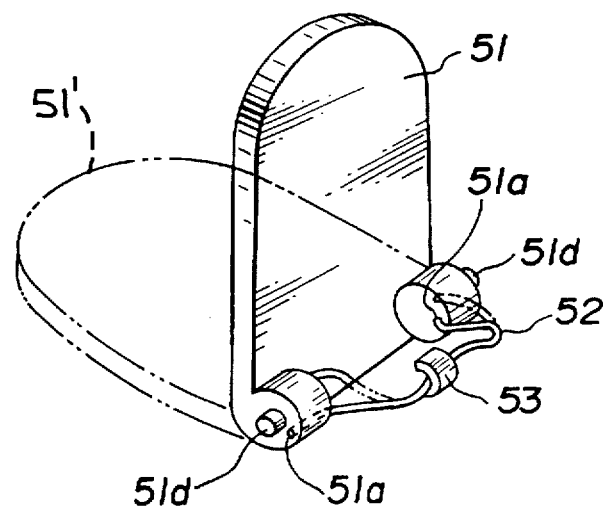
FIG. 6 is a partial perspective view showing a modification of the structure for rotationally biasing the barrier in each embodiment of this invention.
Figure 7:
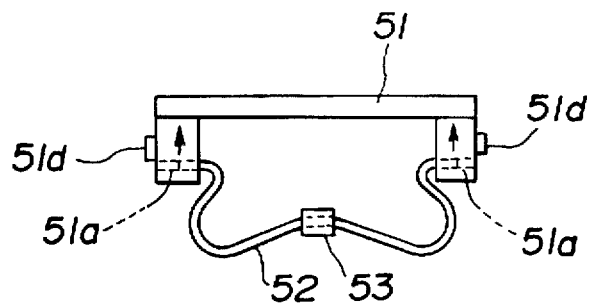
FIG. 7 is a plan view showing a spring incorporated into the barrier of FIG. 6, the spring being illustrated from the top surface side of the camera.

Still further, a description will be taken hereinbelow of the modifications of the means to switch the biasing force to the barrier to the fully open position or to the fully closed position and of the click means to hold the barrier at the fully open position or at the fully closed position. FIG. 6 is a partial perspective view showing a modification of the barrier section in which the barrier is rotationally biased through employment of a spring with a different configuration, and FIG. 7 is a top plan view showing the spring built in the FIG. 6 barrier. A barrier 51 is rotatable about barrier rotary shafts 51d provided in opposite sides thereof, and as well as that of FIG. 1 the barrier 51 is fitted to the barrier hinge 23 of the front cover 3. Holes 51a are bored in the barrier 51 in the vicinity of the barrier rotary shafts 51d so that a spring 52 having a substantially M-like configuration as shown in FIG. 6 and acting as a biasing means is set into the holes 51a in such a manner that both of its end portions are bent and are inserted thereinto. A central portion of this spring 52 is built in the camera in a state that it is held by a U-shaped holding member 53 fixed to the camera body.

In this built-in state, the spring 52 always biases the barrier 51 in the direction indicated by an arrow in FIG. 7. Further, when the barrier 51 is at the fully closed position indicated by a solid line in FIG. 6, the holes 51a are positioned slightly under the barrier rotary shafts 51d and therefore the barrier 51 is rotationally biased by the spring 52 in the closing direction. On the other hand, when the barrier 51 is at the fully open position 51' indicated by a two-dot chain line in FIG. 6, the holes 51a are shifted to above the barrier rotary shaft 51d and hence the barrier 51 is rotationally biased by the spring 52 in the opening direction. Further, through a means similar to those of the driving means in the first, second and third embodiments, the barrier 51 is pushed to rotate between the fully close position and the fully open position. In addition, the direction of the rotation of the barrier 51 due to the biasing force of the spring 52 is switched with respect to the substantially middle position.

Figure 8:
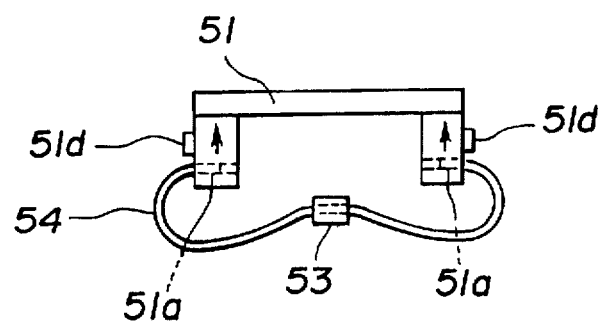
FIG. 8 is a plan view showing a spring different in shape from that of FIG. 6 and built in the barrier, the spring being also illustrated from the upper surface side of the camera.

FIG. 8 is a plan view showing a spring incorporated into a barrier, the spring being different in shape from that of FIG. 6. Although the aforesaid spring 52 is made to be inserted into the holes 51a from the inside ends, a spring 54 serving as a biasing means in FIG. 8 is fitted into the hole 51a from the outside ends. The other points are the same as those in FIG. 7.

Figure 9:
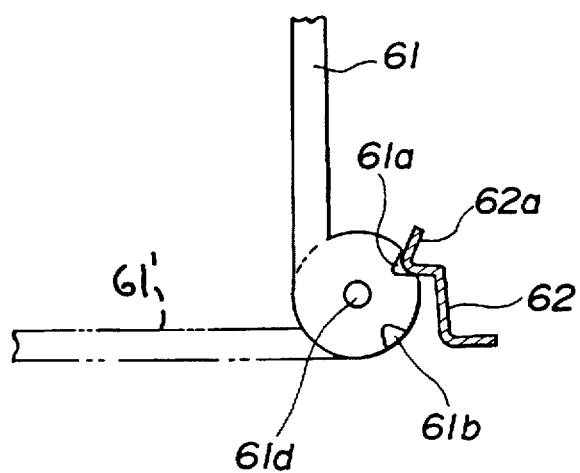
FIG. 9 shows a modification of a structure for holding the barrier to a rotated position in the respective embodiments of this invention, which is viewed from a side direction of a camera.

FIG. 9 is a side elevational partial cross-sectional view showing a modification of the click means for holding the barrier at the rotated position in the cameras according to the respective embodiments, where a solid line represents the fully close position P1 and a two-dot chain line designates the fully opening position. A barrier 61 is supported to be rotatable about a barrier rotary shaft 61d. Further, grooves 61a, 61b each having a substantially V-shaped cross section are formed in the circumferential surface of the rotating section of the barrier 61. These grooves 61a, 61b are provided in correspondence with the fully closed position P1 and the fully open position, respectively. In addition, a leaf spring 62 is, at its one end portion, fixedly secured to the camera body side, while a V-shaped tip portion formed at the other end portion of the same leaf spring 62 comes into engagement and detachment with and from the grooves 61a, 61b, which establishes a click means and a holding means.

When the barrier 61 is at the fully closing position indicated by a solid line in FIG. 9, the tip portion 62a of the leaf spring 62 falls in the groove 61a and is held there. On the other hand, when being at the fully open position 61' indicated by a two-dot chain line in the same illustration, the tip portion 62a of the leaf spring 62 engages with the groove 61b and is held there. This arrangement constitutes a click means and can exhibit the same effects as those of the above-described respective embodiments.

Figure 10:
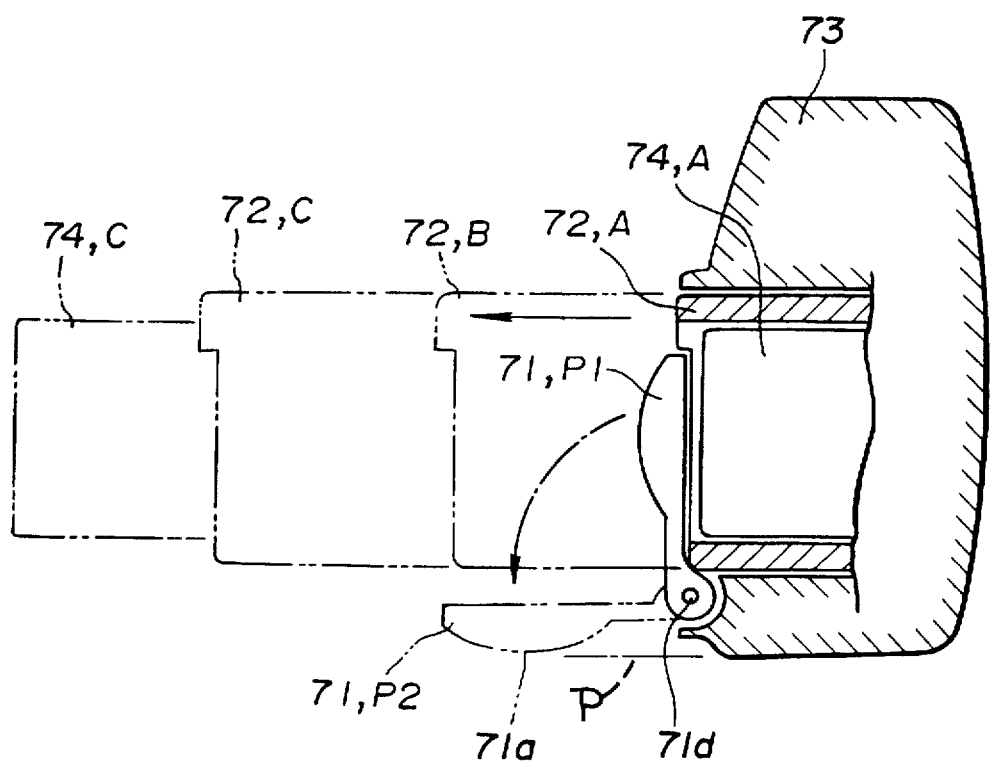
FIG. 10 is a side elevational cross-sectional view showing an applied example of the camera with the barrier in the respective embodiments of this invention.

Moreover, a description will be made hereinbelow of an applied example of the camera with the barrier in the above-described first, second and third embodiments. FIG. 10 is a side elevational cross-sectional illustration of a camera equipped with an outer lens tube and an inner lens tube, showing the relationship between the opening and closing movements of a barrier 71 and the movements of the outer lens tube 72 and the inner lens tube 74 which contain a zoom lens along the optical axis. The photographing lens tube is composed of the inner lens tube 74 and the outer lens tube 72 which contain a photographing zoom lens (not shown), and these lens tubes 74, 72 are made to be movable along the optical axis with respect to a camera body 73. Further, the barrier 71 is attached to a lower portion of the camera body 73 to be rotatable about a barrier rotary shaft 71d. That is, the barrier 71 is rotatable to the fully closed position P1 at which it covers at least a portion of the inner lens tube 74 and further to the fully opening position P2 retreating from the moving path of the inner and outer lens tubes 74, 72.

Secondly, a description will be taken hereinbelow of an operation of the camera as shown in FIG. 10. When the photographing lens tube is at the collapsed position, the outer lens tube 72 takes the collapsed position indicated by character A and houses the inner lens tube 74 therein, and the barrier 71 is at the fully closed position P1. In this state, for photography, a power switch (not shown) is operated to turn ON so that the outer lens tube 72 and the inner lens tube 74 are driven to protrude and stop at the wide focal length position indicated by character B. At this time, the barrier 71 is pressed by the tip portion of the outer lens tube 72 to be rotated about the barrier rotary shaft 71d counterclockwise in FIG. 10, i.e., in the opening direction, and then held at the fully open position P2. With a further zooming operation, when the focal length of the photographing zoom lens is shifted to the tele-side, the outer lens tube 72 and the inner lens tube 74 are driven to further protrude from the wide focal length position B along the optical axis and stop at the tele-local length positions indicated by character C. At this position, the inner lens tube 74 takes a protruding state with respect to the outer lens tube 72 as illustrated. When the barrier 71 is at the fully open position P2, the most protruding portion 71a of the barrier 71 is made to lie substantially in a plane P including the bottom surface of the camera body 73.

According to this camera thus arranged, even if the camera is put on a plane in a state that the tube frame of the photographing lens tube greatly extends forwardly for the zooming so that the center of gravity of the camera shifts forwardly, the bottom surface of the camera body and the protruding portion 71a of the barrier 71 can support the camera on a surface, with the result that it is possible to prevent the camera from falling down forwardly.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A camera having a photographing lens tube movable between a collapsed position taken in a non-photographing condition and an extension position taken in a photographing condition, comprising:

drive means for driving said photographing lens tube within a range between said collapsed position and said extension position; and a barrier composed of a member which is rotatable about a supporting shaft arranged in parallel to a plane substantially perpendicular to an optical axis of a photographing lens to take a closed position at which said barrier covers at least a front surface of said photographing lens and further to take an open position at which said photographing lens front surface is exposed, wherein, when moving to said extension position, said photographing lens tube is brought into contact with said barrier to shift said barrier toward said open position.

2. A camera as defined in claim 1, wherein said supporting shaft of said barrier is fitted in a front surface of said camera and in a vicinity of a bottom surface thereof, and when said photographing lens tube is at said extension position and when said barrier is swingingly rotated to cause a sectorial locus to be shifted up to said fully closed position, a downward most protruding portion of a surface of said barrier relative to a bottom surface of a camera body lying substantially in a plane including said bottom surface of said camera body.

3. a camera as defined in claim 1, wherein said barrier has reflection preventing means along a surface which disappears when said barrier is at said fully closed position and is exposed when said barrier is at said fully open position.

4. A camera as defined in claim 1, further comprising:
a toggle mechanism directly coupled to the barrier for holding said barrier in the closed position when said barrier is at said closed position and biasing said barrier in a rotatable direction toward said open position at least when said photographing lens tube is moved to the extension position by said drive means.

5. A camera as defined in claim 1, further comprising:
a toggle mechanism for holding said barrier in the open position when said barrier has been moved to the open position by the photographing lens tube being moved to the extension position; and
for maintaining said open position independently of any further movement of the photographing lens.

6. A camera as defined in claim 1, further comprising:
a toggle mechanism for holding said barrier in the open position when said barrier has been moved to the open position by said photographing lens tube being moved to the extension position,
said drive means including switching means for switching said drive means to move in said first and second opposing directions in order to respectively extend and collapse the photographing lens tube; and
means coupled between said switch means and said barrier for closing said barrier when said switch means is moved to an off position.

7. A camera having a photographing lens tube movable between a collapsed position taken in a non-photographing condition and an extension position taken in a photographing condition, comprising:
drive means for driving said photographing lens tube within a range between said collapsed position and said extension position;
a barrier rotatable to make a sectorial locus to take a closing position at which said barrier covers at least a front surface of a photographing lens and further to take an opening position to expose said photographing lens front surface;
biasing means equipped with a toggle mechanism for biasing said barrier in one of a closing direction and an opening direction with respect to a substantially middle position between said closing position and said opening position so that said barrier is held at one of said closing position and said opening position; and
switching means for performing a switching operation to operate said drive means so that said photographing lens tube takes one of said collapsed position and said extension position,
wherein said barrier is shifted to said open position by said photographing lens tube which engages and moves the barrier as the lens tube is moved to said extension position by said drive means.

8. A camera having a photographing lens tube movable between a collapsed position taken in a non-photographing condition and an extension position taken in a photographing condition, comprising:
drive means for driving said photographing lens tube within a range between said collapsed position and said extension position;
a barrier rotatable about a rotary shaft provided along a bottom surface portion of said camera to make a sectorial locus to take a closed position at which said barrier covers at least a front surface of said photographing lens and further to take an open position at which said photographing lens front surface is exposed;
biasing means equipped with a toggle mechanism for directly biasing said barrier in one of a closing direction and an opening direction with respect to a substantially intermediate position between said closed position and said open position so that said barrier is held at one of said closed position and said open position; and
switching means for performing a switching operation so that said photographing lens tube takes one of said collapse position and said extension position,
wherein, when moving to said extension position by said switching means, said photographing lens tube engages said barrier to shift said barrier to said open position.

9. A camera as defined in claim 8, further comprising connecting means for making a connection between said switching means and said barrier so that said barrier, connected through said connecting means, is shifted in said closing direction in conjunction with a displacement of said switching means which switches said photographing lens tube from said extension position to said collapsed position.

10. A camera as defined in claim 8, further comprising engaging means engaging said photographing lens tube and said barrier when said photographing lens tube moves from said extension position to said collapsed position to shift said barrier in said closing direction.

11. A camera equipped with a tube including a photographing lens, said photographing lens tube being movable between a collapsed position taken in a non-photographing condition and a photographing position taken in a photographing condition, said camera comprising:
a barrier fitted to a camera body and rotatable about a supporting shaft substantially perpendicular to an optical axis of said photographing lens to make a sectorial locus to take a fully closed position at which said barrier covers at least a front surface of said photographing lens when said photographing lens tube is at said collapsed position and further to take a fully open position at which said barrier retreats from said photographing lens front surface when said photographing lens tube is at said photographing position;
holding means for holding said barrier at one of said fully closed position and said fully open position;
a toggle mechanism for switching a biasing force to said barrier in one of an opening direction and a closing direction with respect to an intermediate position between said fully closed position and said fully open position; and
switching means for switching an operation of said lens tube from said collapsed position to said photographing position and from said photographing position to said collapsed position,
wherein said barrier is rotated from said fully closed position to said fully open position due to engagement by said lens tube as the lens tube moves from said collapsed position to said photographing position by said switching means, and said biasing force applied to said barrier is switched by said toggle mechanism toward said fully open position in an intermediate portion of a rotation of said barrier.

12. A camera equipped with a photographing lens tube movable between a collapsed position taken in a non-photographing condition and a photographing position taken in a photographing condition, said camera comprising:

a barrier fitted to a camera body and rotatable about a supporting shaft parallel to a plane substantially perpendicular to an optical axis of a photographing lens to make a sectorial locus to take a fully closed position at which said barrier covers at least a front surface of said photographing lens when said photographing lens tube is at said collapsed position and further to take a fully position at which said barrier retreats from said photographing lens front surface when said photographing lens tube is at said photographing position;

biasing means for normally biasing said barrier in a closing direction;

holding means for holding said barrier at said fully open position against said biasing means; and switching means for switching a driving direction of said photographing lens tube between a direction from said collapsed position to said photographing position and a direction from said photographing position to said collapsed position, wherein said barrier is rotated from said fully closed position to said fully open position in conjunction with movement of said photographing lens tube from said collapsed position to said photographing position by said switching means, and further is held at said fully open position by said holding means; and said barrier being released from said holding means when said switching means operates to shift said photographing lens tube from said photographing position to said collapsed position, and said biasing means rotates said barrier to said fully closed position.

13. A camera including a photographing lens movable along an optical axis, said camera comprising:

a barrier member movable between a first position at which said barrier member covers a front surface of said photographing lens and a second position at which the barrier member retreats from said photographing lens front surface;

biasing means directly coupled to said barrier member to bias said barrier member when said barrier member is at said first position so that said barrier member is held at said first position, while biasing said barrier member when said barrier member is at said second position so that said barrier member is held at said second position; and engaging means for making direct engagement between said barrier member and said photographing lens when said photographing lens moves rearwardly, engagement by the engagement means causing said barrier member to shift from said second position to said first position, wherein, when said photographing lens moves forwardly, said photographing lens is brought into contact with said barrier member to shift said barrier member from said first position toward the second position said and said biasing means shifts said barrier member to said second position, and when said photographing lens moves rearwardly, said photographing lens engages said barrier member to shift said barrier member from said second position to said first position.

14. A camera as defined in claim 13, wherein said barrier member is equipped with hinge means and is rotated around said hinge means.

15. A camera as defined in claim 13, wherein said biasing means is composed of toggle spring means.

16. A camera as defined in claim 15, wherein said toggle spring means is an overcenter-type toggle spring means.

17. A camera as defined in claim 15, wherein said toggle spring means has a substantially M-shaped configuration.

18. A camera having a photographing lens tube movable between a collapsed position taken in a non-photographing condition and an extension position taken in a photographing condition, comprising:

drive means for driving said photographing lens tube within a range between said collapsed position and said extension position;

a barrier composed of a member which is rotatable about a supporting shaft perpendicular to an optical axis of a photographing lens to take a closed position at which said barrier covers at least a front surface of said photographing lens and further to take an open position at which said photographing lens front surface is exposed;

said photographing lens tube having a substantially U-shaped tip portion at a free end of said lens tube and projecting beyond said free end of said lens tube;

said barrier having a semi-circular shaped free end and a width across said barrier enabling said semi-circular shaped free end to fit within said U-shaped tip portion when said lens tube is fully collapsed and said barrier is in the fully closed position.

19. A camera having a photographing lens tube movable between a collapsed position taken in a non-photographing condition and an extension position taken in a photographing condition, comprising:

drive means for driving said photographing lens tube within a range between said collapsed position and said extension position;

a barrier composed of a member which is rotatable about a supporting shaft arranged in parallel to a plane substantially perpendicular to an optical axis of a photographing lens to take a closed position at which said barrier covers at least a front surface of said photographing lens and further to be driven to an open position by a portion of said lens tube adjacent said lens front surface engaging said barrier when said lens tube is moved to said extension position, at which position said photographing lens front surface is exposed;

at least a portion of a front surface of said barrier being arranged to lie in a common plane with a bottom surface of said camera so that said barrier prevents the camera from falling in a forward direction when said barrier is in the open position and said camera bottom surface and said exterior surface of said barrier are arranged on a substantially flat support surface.

* * * * *

UNITED STATES PATENT AND TRADEMARK OFFICE
CERTIFICATE OF CORRECTION

PATENT NO. : 5,797,047
DATED : August 18, 1998
INVENTOR(S) : Ando et al.

It is certified that error appears in the above-identified patent and that said Letters Patent is hereby corrected as shown below:

In the Abstract, line 13, delete "opening" and insert instead --open--.

Col. 8, line 11, delete "opening" and insert instead --open--.

Signed and Sealed this

Seventeenth Day of August, 1999

Attest:

Q. TODD DICKINSON

*Attesting Officer*     *Acting Commissioner of Patents and Trademarks*